US006579599B1

(12) United States Patent
Blum et al.

(10) Patent No.: US 6,579,599 B1
(45) Date of Patent: Jun. 17, 2003

(54) PRINTING

(75) Inventors: Peter Michael Blum, Cheshire (GB); Harjit Singh Bhambra, Leeds (GB)

(73) Assignee: Kodak Polychrome Graphics LLC, Norwalk, CT (US)

(*) Notice: Subject to any disclaimer, the term of this patent is extended or adjusted under 35 U.S.C. 154(b) by 234 days.

(21) Appl. No.: 09/618,429

(22) Filed: Jul. 18, 2000

Related U.S. Application Data

(63) Continuation of application No. PCT/GB99/00693, filed on Mar. 8, 1999.

(30) Foreign Application Priority Data

Mar. 6, 1998 (GB) ............................................ 9804743

(51) Int. Cl.[7] ............................ B32B 27/14; B32B 3/00

(52) U.S. Cl. ................. 428/196; 428/297.4; 428/298.1; 428/299.1; 428/323; 428/429; 428/447; 428/448

(58) Field of Search .............................. 428/196, 297.4, 428/298.1, 299.1, 323, 429, 447, 448

(56) References Cited

U.S. PATENT DOCUMENTS

| | | | | | |
|---|---|---|---|---|---|
| 2,134,165 | A | | 10/1938 | Wescott | 41/41.5 |
| 2,290,719 | A | | 7/1942 | Todd | 101/395 |
| 2,941,466 | A | | 6/1960 | Newman et al. | 101/149.2 |
| 3,652,376 | A | * | 3/1972 | Bowden, III | 161/159 |
| 4,341,839 | A | | 7/1982 | Shaw et al. | 428/342 |
| 6,138,568 | A | * | 10/2000 | McCullough et al. | 101/465 |
| 6,180,037 | B1 | * | 1/2001 | Anderesen et al. | 264/108 |
| 6,182,571 | B1 | * | 2/2001 | Jolliffe et al. | 101/465 |

FOREIGN PATENT DOCUMENTS

| | | |
|---|---|---|
| DE | 2609080 | 9/1977 |
| FR | 1087920 | 3/1955 |
| FR | 2023813 | 8/1970 |
| FR | 2206867 | 6/1974 |
| GB | 573974 | 12/1945 |
| GB | 912827 | 12/1962 |
| GB | 940022 | 10/1963 |
| GB | 953560 | 3/1964 |
| GB | 1121868 | 7/1968 |
| GB | 1294896 | 11/1972 |
| GB | 1455136 | 11/1976 |
| GB | 1514497 | 6/1978 |
| GB | 2019023 | 10/1979 |
| GB | 2201007 | 8/1988 |
| JP | 07098507 | 4/1995 |
| WO | 8400519 | 2/1984 |

OTHER PUBLICATIONS

Patent Abstracts of Japan, vol. 006, No. 263, Publication No. 57156296, Sep. 27, 1982, 1 page.

Derwent database WPI Abstract No. 89–104662, Abstract of JP 1052169, Feb. 28, 1989, 1 page.

Derwent database WPI Abstract No. 92–240307, Abstract of SU 1669883, Aug. 15, 1991, 1 page.

* cited by examiner

*Primary Examiner*—Bruce H. Hess
*Assistant Examiner*—B. Shewareged
(74) *Attorney, Agent, or Firm*—Faegre & Benson, LLP

(57) ABSTRACT

A printing member, especially a planographic printing member, comprising a first layer which includes a fibrous material, especially a cellulosic fibrous material or a ceramic fibrous material, and a binder, for example a resin or the like, is described. An image defining means is provided over the first layer.

13 Claims, No Drawings

PRINTING

CROSS-REFERENCE TO RELATED APPLICATIONS

This is a continuation of International Application No. PCT/GB99/00693, which was filed on Mar. 8, 1999 and which published in English or Sep. 10, 1999, which in turn claims priority from GB Application No. 9804 743.4, which was filed on Mar. 6, 1998.

The invention relates to printing and particularly, although not exclusively, relates to a printing member, and a method of preparing a printing member. Preferred embodiments relate to planographic, especially lithographic, printing.

Lithographic processes involve establishing image (printing) and non-image (non-printing) areas on a substrate, substantially on a common plane. When such processes are used in printing industries, non-image areas and image areas are arranged to have different affinities for printing ink. For example, non-image areas may be generally hydrophilic or oleophobic and image areas may be oleophilic. In "wet" lithographic printing, a dampening or fountain (water-based) liquid is applied initially to a plate prior to application of ink so that it adheres to the non-image areas and repels oil based inks therefrom. In "dry" printing, ink is repelled from non-image areas due to their release property.

One of the most common substrates used in lithographic printing comprises an aluminium base layer which is treated to make it suitable for use. In general, the aluminium layer comprises high quality aluminium, for example 1050 alloy which is at least 99.5% pure. For preparation of a substrate, the aluminium is roughened, for example by electrograining, anodised and then conditioned by chemical means, for example by treatment with water, a solution of phosphate or silicate salt, or a polycarboxylic acid.

Aluminium has many of the properties required for making a good printing plate. For example, 1050 alloy has a high Young's Modulus (tension) of about 70 GPa; an ultimate tensile strength (before baking) in the range 150–200 MPa; a fatigue limit of about 50 MPa (at $5\times10^{8}$ cycles —R.R. Moore-type test); and a hardness of about 38 HB (measured using 50 Kg load, 10 mm ball, 30 seconds duration).

However, aluminium's high thermal conductivity can cause problems in certain types of printing plates. For example, printing plates are known (see e.g PCT/GB98/00266 and/or U.S. Pat. No. 5,339,737) wherein areas of a radiation sensitive layer are ablated by heat delivered by a laser in order to define ink-accepting and non-ink-accepting areas. However, if a layer to be ablated is contiguous with or close to an aluminium layer, the aluminium may conduct heat away from imaged areas, thereby reducing the amount of heat energy available to effect ablation. Thus, more heat may need to be delivered to effect ablation compared to a case wherein a less thermally conductive material is used instead of aluminium. Similarly, thermal imaging systems are known which image a plate by direct physical contact of a heated body, such as a heat stylus (or the like), with the plate. Heat is conducted from such a body to a heat sensitive layer to effect a change in the layer, for example involving increasing its solubility in a developer. However, it is found that aluminium is a poor support for such thermally imageable plates, since it conducts too much heat away from a heat sensitive layer and thereby increases the power needed to image the plate. Another disadvantage associated with aluminium plates is that more energy may be required to dry such plates and/or to dry coatings used in the manufacture of the plates.

Furthermore, it is a practice, particularly in the U.S, to bake plates at about 280° C. for up to 2 minutes after development in order to cross-link the photocoat and thereby increase the run length of the plate. However, such baking risks excessively annealing the aluminium and, in any event, its tensile strength may be reduced by more than 30 MPa, as a result of the baking process. Consequently, there is a risk that the aluminium may crack and fail in use, resulting in possible damage to the press and subsequent press downtime.

Another disadvantage of aluminium is that aqueous chemicals used in developer fluids or fount solutions may dissolve areas of the aluminium leading to contamination of the fluids and possible clogging of presses and/or development apparatus. Additionally, contaminated fluids must be disposed of in an environmentally acceptable manner.

Further disadvantages of aluminium include the need to clean it before use to remove grease which is applied by the manufacturers to restrict corrosion and, additionally, its sharp edges mean it must be handled with extreme care.

Despite the highlighted disadvantages, aluminium plates are widely used, especially for long print runs of 500,000 or more.

The use of polyester as a support of a lithographic printing plate is widely described in patent literature and some such plates are commercially available. However, polyester plates are generally significantly inferior to aluminium plates due to the properties of polyester. For example, polyester has a low tear resistance. Additionally, the Young's modulus (tension) of polyester may be in the range 3–7 GPa. This leads to one major disadvantage of polyester which is the fact that polyester has inadequate dimensional stability and tends to stretch on-press which means that there is a registration problem if polyester plates are used in colour printing. As a result, polyester plates are generally only used for black and white or spot colour printing or for colour printing in small formats.

An additional problem with polyester is the difficulty in causing a hydrophilic layer to adhere strongly to the polyester. Consequently, the hydrophilic layer may wear quickly and/or delaminate. As a result, polyester plates fail relatively quickly and are, therefore, only used for relatively short run lengths, typically of up to 20,000 impressions.

Compared to aluminium, polyester has a very low thermal conductivity and, therefore, does not suffer from the same disadvantages in thermal imaging techniques as for aluminium discussed above. However, there is a restriction on the power that can be supplied to polyester based thermally-imageable plates since too much power may heat the polyester to such an extent that there is a risk that it may distort. It is found in practice that polyester cannot be used as a support for plates imaged by heated bodies because sufficient power cannot be supplied to image the plates without affecting the polyester.

Another support which has been proposed for printing plates is paper. However, the physical properties of the papers used are such that they can only be used for extremely short run length plates of only a few thousand impressions. One major drawback is that paper is water absorbent and, therefore, has a tendency to absorb fount solution used in "wet" lithographic printing. Another problem with paper is that its tear resistance and its Young's Modulus (tension) are of a similar magnitude to that of polyester, discussed above.

One advantage of polyester over aluminium is the potential use of widely available film image setters to digitally image polyester-based plates. Such apparatus requires relatively light and flexible plates, usually having a Young's modulus (tension) of less than 45 GPa. Thus, polyester can be used in such situations, but aluminum cannot. Digital imaging of aluminium plates, therefore, tends to be carried out using relatively expensive purpose-designed plate setters. Another advantage of polyester is that it can be formed into small coils and used in, for example, cassettes for image-setters used in direct to press applications.

It is an object of the present invention to address problems associated with substrates of printing members.

According to a first aspect of the present invention, there is provided a printing member which includes:

a first layer comprising a fibrous material and a binder material; and an image-defining means.

Said printing member could be for any type of printing, for example flexographic or planographic printing. Preferably, said printing member is a planographic printing member. Whilst said printing member could be a roller (or the like), it is preferably a printing plate.

Said fibrous material may be a naturally-occurring fibrous material or a synthetic fibrous material. It is preferably a naturally-occurring fibrous material.

Preferred naturally-occurring fibrous materials include cellulose-based materials, for example, wood pulp, wool or cotton. Cellulosic fibres of cellulose-based materials have high strength which, when in combination with said binder, can produce an advantageous printing member.

Synthetic fibrous materials include derivatives of naturally-occurring fibrous materials, organic fibrous materials and inorganic fibrous materials.

Derivatives of naturally-occurring fibrous materials include, for example, acetylated, aminized or cyanoethylated cotton; wool derivatives; or any cellulose derivative.

Organic fibrous materials include polyesters and nylons.

Inorganic fibrous materials may be made of ceramic materials, metals, metal alloys or comprise carbon fibre. Preferably, said inorganic fibrous material is not carbon fibre. Examples of ceramic materials include glass fibre, silica fibre, boron fibre and silicon nitride fibre. An example of a metal which may be drawn into a fibre or fine wire is mild steel. A preferred ceramic material is glass fibre.

Unless otherwise stated herein, a major portion suitably means greater than 50 wt %, preferably greater than 75 wt %, more preferably greater than 90 wt %, especially about 100 wt % of the total amount of a referenced component.

Said fibrous material is preferably embedded in said binder material. Said fibrous material may include randomly arranged fibres which are held together by said binder material or may comprise a non-random arrangement. For example, in the latter case, said fibres may be components of yarns. In this case, said yarns of said fibrous material may be arranged in a non-random arrangement. For example, said yarns may be woven to define a textile material (a fabric), suitably having warp and weft threads.

Fibres of said fibrous material are preferably held together by a means in addition to any holding together effected by the presence of said binder material. Thus, said fibrous material is preferably such that it could exist as a mass of fibres, in its own right, in the absence of said binder material. Said means for holding is preferably in place before a binder material is contacted with said fibrous material to provide said first layer. Said fibres may be held together by a physical and/or chemical interaction (excluding any interaction due to Van der Waals forces acting between fibres). A physical interaction may be due to the fibrous material being in the form of a woven or non-woven material. In a woven material, the fibres are held together by weaving of lengths of fibres. In a non-woven material, fibres may be held together by them having been compressed and/or heat-bound together. A chemical interaction may be due to the formation of chemical bonds (excluding Van der Waals bonds) between fibres. Preferred chemical bonds are hydrogen bonds. Where said fibres form a non-woven material, it is preferred that the fibres are capable of chemically-interacting, especially hydrogen bonding, with one another. Preferably, said fibres include hydroxy groups, or other functional groups capable of forming a hydrogen bond. In this case, said fibres may define a paper.

Preferred fibres for use in a non-woven material are not straight, but are convoluted. Such fibres may have a dendridic structure.

Said first layer is preferably preparable (and/or prepared) by contacting a preformed mass of fibrous material with a said binder material.

Said fibrous material of said first layer may include one or more fibrous materials as described above. Preferably, it includes a major proportion of a fibrous material of one type.

Said fibrous material may include fibres (preferably a major proportion thereof) having a diameter of at least 0.05 $\mu$m, suitably at least 0.1 $\mu$m, preferably at least 0.5 $\mu$m, more preferably at least 5 $\mu$m, especially at least 8 $\mu$m. Said fibrous material may include fibres (preferably a major proportion thereof) having a diameter of less than 100 $\mu$m, suitably less than 50 $\mu$m, preferably less than 25 $\mu$m, more preferably less than 15 $\mu$m, especially less than 10 $\mu$m. Where said fibrous material comprises a naturally-occurring fibrous material (especially cellulosic fibres), the diameter of such fibres (preferably a major proportion thereof) is preferably in the range 2–20 $\mu$m, more preferably in the range 6–15 $\mu$m.

Said fibrous material may include fibres (preferably a major proportion thereof) having a length of at least 0.5 mm, suitably at least 1 mm, preferably at least 1.5 mm, more preferably at least 5 mm, preferably at least 8 mm, more preferably at least 10 mm, especially at least 12 mm. Except where the fibrous material defines a woven material, said fibrous material may include fibres (preferably a major proportion thereof) having a length of less than 50 mm, suitably less than 30 mm, preferably less than 25 mm, more preferably less than 20 mm.

Said fibrous material may include fibres (preferably a major proportion thereof) having density of at least 1.0, suitably at least 1.1, preferably at least 1.5, more preferably at least 2.0, especially at least $2.5\times10^3$Kgm$^{-3}$ Said fibrous material may include fibres (preferably a major proportion thereof) having a density of less than 5, suitably less than 4.5, preferably less than 4, more preferably less than 3.5, especially less than $3\times10^{3}$ Kgm$^{-3}$. Where said fibrous material comprises a naturally-occurring fibrous material (especially cellulosic fibres) the density may be less than 2.0, more preferably less than 1.5 g/cm$^3$.

Said fibrous material may include fibres (preferably a major proportion thereof) having an ultimate tensile strength of at least 0.1, suitably at least 0.5, preferably at least 1.0, more preferably at least 1.5, especially at least $1.7\times10^3$ MNm$^{-2}$. Said fibrous material may include fibres (preferably a major proportion thereof) having a tensile strength of less than 30, suitably less than 20, preferably less than 10, more preferably less than 5, especially less than $2.5\times10^{-3}$ MNm$^{-2}$.

Said fibrous material may include fibres (preferably a major proportion thereof) having a Young's modulus (tension) measures in a direction parallel to the fibre axis of at least 20, suitably at least 40, preferably at least 50, more preferably at least 60, especially 70 GPa or above. Said fibrous material may include fibres (preferably a major proportion thereof) having a said Young's modulus of less than 750, suitably less than 600, preferably less than 400, more preferably less than 100, especially less than 80 GPa.

Where said fibrous material is inorganic, it may include fibres (preferably a major proportion thereof) having a softening point of at least 500° C., suitably at least 600° C., preferably at least 650° C., more preferably at least 700° C., especially 750° C. or above. Said softening point may be less than 1400° C., suitably less than 1200° C., preferably less than 1000° C., Where said fibrous material comprises glass fibre, said glass fibre may be made from a number of raw materials which may be fed in powder form to a furnace and heated to a high temperature of the order of 1400° C. A preferred glass fibre may be made from at least 40 wt %, preferably at least 45 wt %, more preferably at least 50 wt %, especially at least 55 wt % of silicon dioxide. The amount of silicon dioxide is suitably less than 70 wt %, preferably less than 65 wt %, more preferably less than 60 wt %.

A preferred glass fibre may be made from at least 10 wt %, especially at least 14 wt %, more preferably at least 20 wt % calcium oxide. The amount of calcium oxide is suitably less than 30 wt %, preferably 25 wt % or less and, more preferably less than 22 wt %.

A preferred glass fibre may be made from at least 5 wt %, preferably at least 10 wt %, more preferably at least 14 wt %, aluminum oxide. The amount of aluminium oxide is suitably less than 25 wt %, preferably less than 20 wt %, more preferably less than 16 wt %.

A preferred glass fibre may be made from at least 3 wt %, preferably at least 5 wt %, more preferably at least 7 wt % boron oxide. The amount of boron oxide may be less than 15 wt %, preferably less than 12 wt %, more preferably less than 9 wt %.

A preferred glass fibre includes at least 0.1 wt %, preferably at least 0.5 wt % magnesium oxide. The amount of magnesium oxide is suitably less than 5 wt %, preferably less than 3 wt %, more preferably less than 1 wt %.

A preferred glass fibre includes sodium and/or potassium oxide in an amount of at least 0.1 wt %, preferably at least 0.3 wt %, more preferably at least 0.5 wt %. Said oxide may be present in an amount less than 5 wt %, preferably less than 2 wt %, more preferably 1 wt % or less.

Preferably, said glass fibre is a borosilicate.

Said fibrous material may be functionalised (or otherwise treated) to aid its mixing and/or bonding with the binder material. For example, where the binder material is generally organic in character and said fibrous material is generally inorganic in character, said fibrous material may be functionalised to render it more organic in character. For example, glass fibre may be functionalised by organosilanes by reaction of hydroxy groups of the silane with hydroxy groups of the class fibre to form Si—O—Si bonds.

The nature of the binder material may be selected depending upon the nature of a layer which is provided over said first layer.

Said binder material may include an inorganic or organic binder composition, suitably as a major portion of said binder material.

Binder materials may comprise any materials which are described hereinafter in the preparation of hydrophilic layers, but excluding hydrophilic layers which are not applied as liquids. For example, binder materials may comprise sols, such as organosols, or gels.

A preferred inorganic binder material is a polymeric material which includes —Si—O—Si— moieties. Such an inorganic material may be derived from a silicate solution. Details of suitable silicate solutions are described hereinafter with reference to a hydrophilic layer which may be arranged over the first layer. Any feature of said silicate solution described with reference to said hydrophilic layer may be a feature of a silicate solution used to provide an inorganic binder material of said first layer. Additionally, the hydrophilic layer described hereinafter includes particulate material. Any feature of a said particulate material of said hydrophilic layer may be a feature of said inorganic binder material of said first layer.

An organic binder composition of said binder material may be a resin or a latex. Preferably it is a resin, more preferably a synthetic resin. Preferred resins are thermosetting. Preferred resins are tough and substantially resistant to water and/or corrosive chemicals. Preferred resins are electrical insulators. Said resin may have a glass transition temperature (Tg) measured by Differential Scanning Calorimetry (DSC) of at least 110° C., suitably at least 120° C., preferably at least 125° C., more preferably at least 130° C., especially at least 135° C. The Tg may be less than 300° C., suitably less than 250° C., preferably less than 200° C., more preferably less than 180° C., especially less than 160° C. Suitable resins may be selected from amides, epoxy and phenolic resins, with epoxy and phenolic resins being preferred and of these phenolic resins are especially preferred.

Said binder preferably does not include an ester functional group. Said binder is preferably not a polyester, especially not polyethylene terephthalate.

Said first layer may include at least (preferably more than) 30 wt %, suitably at least (preferably more than) 40 wt %, preferably at least (preferably more than) 45 wt %, more preferably at least (preferably more than) 50 wt %, especially at least (preferably more than) 55 wt % of said fibrous material. Said first layer preferably includes less than 80 wt %, more preferably less than 70 wt %, especially less than 60 wt % of said fibrous material.

Said first layer may include at least 30 wt %, suitably at least 35 wt %, preferably at least 40 wt %, of said binder material. Said first layer may include less than 80 wt %, suitably less than 70 wt %, preferably less than 60 wt %, more preferably less than 50 wt %, especially less than 45 wt % of said binder material.

The ratio of fibrous material to binder material in said first layer may be in the range 2 to 0.5, preferably in the range 1.5 to 0.6, more preferably in the range 1.2 to 0.8.

Said first layer is preferably a single layer; that is, it is preferably not of multilayer construction. A middle region, positioned between opposing surfaces so the first layer is preferably substantially homogenous, suitably with the binder material being substantially uniformly distributed throughout the region. The middle region may comprise greater than 80%, preferably greater than 90%, more preferably greater than 95% of said first layer. The binder material is preferably substantially uniformly distributed throughout the first layer, except perhaps for small differences in the concentration at a surface thereof, due to steps taken to make said surface as smooth as possible. Thus, preferably the binder material is not present at a significantly higher concentration towards a surface of the first layer, compared to its concentration in the middle of the first layer and/or towards an opposite surface of the first layer.

Preferably, said binder material of said first layer is an organic binder of the type described.

The Young's modulus (tension) of said first layer in a first direction may be at least 8 GPa, suitably at least 10 GPa, preferably at least 15 GPa, more preferably at least 20 GPa, especially at least 25 GPa. Said modulus may be less than 70 GPa, preferably less than 60 GPa, more preferably less than 50 GPa, especially less than 45 GPa. Where the first layer includes a woven material having warp and weft yarns, the average of the Young's modulus (tension) measured in the directions of the warp and weft yarns may have the values mentioned above.

Said first layer is preferably substantially non-porous. Said first layer is preferably substantially non-water absorbent. Preferably, the weight of the first layer does not increase by more than 0.5%, more preferably more than 0.1%, when immersed in water at 20° C. for 8 hours.

The density of said first layer may be at least 1.0 g/cm$^3$, suitably at least 1.1 g/cm$^3$, preferably at least 1.2 g/cm$^3$, more preferably at least 1.3 g/cm$^3$, especially at least 1.4 g/cm$^3$, and, most preferably, at least 1.45 g/cm$^3$. The density is suitably less than 2.2 g/cm$^3$, preferably less than 2.0 g/cm$^3$, more preferably less than 1.8 g/cm$^3$, especially less than 1.7 g/cm$^3$.

The Young's Modulus (tension) of said first layer suitably reduces by less than 20%, preferably less than 10% after heating at a temperature of 240° C. for 10 minutes. In fact, Young's modulus (tension) may not change at all upon such heating or may even increase. Thus, a printing plate incorporating said first layer can be baked after exposure with little detrimental (and possibly with an advantageous) effect.

The thermal expansion of said first layer (measured below the Tg of said layer) is suitably less than 40 ppm/°C., preferably less than 30 ppm/°C., more preferably less than 20 ppm/°C. and is especially 18 ppm/°C. or less.

Said first layer may be heat bendable; that is, it may be possible to bend the first layer and for the bend to be retained. Advantageously, this may enable plates incorporating a said first layer to be secured on-press in the same way that aluminium plates are secured on-press.

Said first layer may include materials in addition to said fibrous material and binder material. For example, it may include particulate material as described above (one suitable material being colloidal silica), or may include plasticizers. Additionally, it may include a cross-linking agent or other compound arranged to cause reaction within the binder material. For example, where the binder material is an epoxy resin, a dicyanodiamide compound may be included to cause reaction between polymeric species of the resin thereby to increase the molecular weight of the resin. Another material that may be included in said first layer is an anti-halation material, for example a dye (or the like).

Where said first layer includes other materials such materials may be present in a minor amount. A minor amount in the context of this specification may be less is than 30 wt % of the total weight of said first layer, suitably less than 20 wt %, preferably less than 10 wt %, more preferably less than 5 wt %, especially less than 1 wt %.

Said printing plate preferably includes a non-ink-accepting layer suitably outside said first layer, preferably over said first layer. An adhesive layer may be provided between a surface of said first layer and said non-ink-accepting layer. Preferably, however, said non-ink-accepting layer is contiguous with a surface of said first layer.

Said non-ink-accepting layer may be non-ink-accepting to ink for use in waterless lithographic printing. In this case, it preferably comprises a material having a low surface energy and may comprise a silicone compound or a perfluoroalkyl group containing compound. Alternatively, said non-ink-accepting layer may be hydrophilic. Said layer is preferably hydrophilic.

Any type of hydrophilic layer may be selected, provided it can be fixed relative to said first layer whether by an adhesive, or by means of another layer or layers between said first layer and said hydrophilic layer or by another means. For example, said hydrophilic layer may comprise a metal layer, such as aluminium, zinc or titanium layer, with aluminium being especially preferred. A metal layer may be laminated to said first layer (and optionally grained and/or anodized) or may be applied by sputtering (or the like), suitably at less than ambient pressure using, for example a vacuum deposition technique. Alternatively, said hydrophilic layer may be formed in a dry deposition technique, for example by a thermal deposition technique, by depositing a particulate material, especially alumina and/or silica, onto a surface, for example of said first layer. Details of such dry deposition techniques, including characteristics of apparatus and materials therefor are provided in European Patent Application Numbers 94908815.7 and 95928587.5 and the contents of said applications are incorporated herein. In one embodiment, the first layer may be heated and a powder sprayed on so that the powder adheres to the first layer, suitably as a consequence of softening of the binder material, especially an epoxy binder material. Analogous processes are described in U.S. Pat. No. 4,456,670 and EP 4 507 383.

Preferably, a copper layer is not contiguous with one side of said first layer. Preferably, no copper layer is contiguous with any side of said first layer. Preferably, a non-copper layer is contiguous with said first layer.

A preferred hydrophilic layer is provided by application of a fluid, optionally containing a particulate material. One such hydrophilic layer is described in European Patent Application No 91903910.7 (the contents of which are incorporated herein) and comprises an oxide layer derived from a Type A sol, preferably a hydrous metal oxide sol, especially a zirconia sol. The Type A sol is itself derived from an inorganic precursor and the oxide layer includes discrete inorganic particles below 10 $\mu$m.

Another such hydrophilic layer is described in PCT Patent Application No WO 83/00844 (the contents of which are incorporated herein) and comprises a ceramic layer provided on a substrate by applying to the substrate a slurry of at least one monobasic phosphate and inorganic non-metallic particles and firing the slurry at a temperature of at least 230° C. to form a ceramic coating.

Further suitable hydrophilic layers are described in European Patent Publication No's EP 0 619 524, EP 0 619 525, EP 0 620 502, EP 0 632 325 and EP 0 628 409 (and the contents of said applications are incorporated herein). In general, the aforementioned documents describe a hydrophilic layer containing a hydrophilic (co)polymer or (co) polymer mixture hardened with a hydrolysed tetralkyl orthosilicate cross-linking agent.

An especially preferred hydrophilic layer is described in Applicant's PCT Patent application No. PCT/GB96/02883 (and the contents of said application are incorporated herein).

Preferably, said hydrophilic layer includes a binder material which is derived or derivable from a silicate solution, and particulate material. Preferably, said binder material comprises a polymeric structure which includes —Si—O—Si— moieties in which a particulate material is arranged.

Said particulate material may be organic or inorganic. Organic particulate materials may be provided by latexes. Inorganic particulate materials may be selected from alumina, silica, silicon carbide, zinc sulphide, zirconia, barium sulphate, talcs, clays (e.g. kaolin) and lithopone in addition to said titanium dioxide.

Said particulate material may comprise a first material which may have a hardness of greater than 8 Modified Mohs (on a scale of 0 to 15), preferably greater than 9 and, more preferably, greater than 10 Modified Mohs.

Said first material may comprise generally spherical particles. Alternatively, said material may comprise flattened particles or platelets.

Said first material may have a mean particle size of at least 0.1 $\mu$m and preferably at least 0.5 $\mu$m.

Said first material may have a mean particle size of less than 45 $\mu$m, preferably less than 20 $\mu$m, more preferably less than 10 $\mu$m.

The particle size distribution for 95% of particles of the first material may be in the range 0.01 to 150 $\mu$m, preferably in the range 0.05 to 75 $\mu$m, more preferably in the range 0.05 to 30 $\mu$m.

Said first material preferably comprises an inorganic material. Said first material preferably comprises alumina which term includes $Al_2O_3$ and hydrates thereof, for example $Al_2O_3.3H_2O$. Preferably, said material is $Al_2O_3$.

Said particulate material may comprise a second material. Said second material may have a mean particle size of at least 0.001 $\mu$m, preferably at least 0.01 $\mu$m. Said second material may have a mean particle size of less than 10 $\mu$m, preferably less than 5 $\mu$m and, more preferably, less than 1 $\mu$m.

Mean particle sizes of said first and second materials suitably refer to the primary particle sizes of said materials.

Said second material is preferably a pigment. Said second material is preferably inorganic. Said second material is preferably titanium dioxide.

Said first and second materials preferably define a multimodal, for example a bimodal, particle size distribution.

Preferably, 30 to 80 wt %, more preferably 40 to 70 wt %, of said hydrophilic layer is composed of said particulate material.

Said particulate material of said hydrophilic layer may include at least 20 wt %, preferably at least 30 wt %, more preferably, at least 40 wt % of said first material.

Said particulate material of said hydrophilic layer may include at least 20 wt %, preferably at least 30 wt %, more preferably, at least 40 wt % of said second material.

In the hydrophilic layer, the ratio of the wt % of first material to the wt % of second material may be in the range 0.5 to 2, preferably in the range 0.75 to 1.5, more preferably, about 1 to 1.

Said hydrophilic layer preferably does not include a thermoplastics organic polymeric material, for example polyvinylidene fluoride or the like.

Said hydrophilic layer preferably has an average thickness of less than 20 $\mu$m, preferably less than 10 $\mu$m and, more preferably, less than 5 $\mu$m.

Said hydrophilic layer preferably has an average thickness of greater than 0.1 $\mu$m, preferably greater than 0.3 $\mu$m, more preferably, greater than 0.5 $\mu$m.

Said hydrophilic layer may have an Ra, measured using a stylus measuring instrument (a Hommelmeter T2000) with an LV-50 measuring head, in the range 0.1 to 2 $\mu$m, suitably in the range 0.2 to 2 $\mu$m, preferably in the range 0.2 $\mu$m to 1 $\mu$m, more preferably in the range 0.3 to 0.8 $\mu$m, especially in the range 0.4 to 0.8 $\mu$m.

Said hydrophilic layer may include 1 to 20 g of material per meter squared of substrate. Preferably said layer includes 5 to 15 g, more preferably 8 to 12 g, of material per meter squared of substrate. Most preferably, said layer includes about 10 g of material per meter squared.

Said image-defining means may be a layer which can be partially removed (by any means) to define an image; or may be a layer which already defines an image.

Said image-defining means may comprise any known radiation sensitive material whether arranged to form a positive or negative plate. Examples of radiation sensitive materials include diazonium/diazide materials, polymers which undergo depolymerisation or addition photopolymerisation and silver halide gelatin assemblies. Examples of suitable materials are disclosed in GB 1 592 281, GB 2 031 442, GB 2 069 164, GB 2 080 964, GB 2 109 573, EP 0 377 589, U.S. Pat. Nos. 4,268,609 and 4,567,131. Said radiation sensitive material may be arranged to ablate on application of radiation. Preferably, the radiation sensitive material is a quinone diazide material.

Alternatively, an image layer in the form of a desired image for use in planographic printing may be deposited over said first layer by a deposition process such as ink jet or laser ablation transfer. An example of the latter is described in U.S. Pat. No. 5,171,650.

The use of a first layer as described may be particularly advantageous with image-defining means in relation to which heat is generated as part of the imaging process, for example in imaging by laser ablation or in so-called heat mode imaging, especially where imaging is effected by use of a heated body, for example comprising heated pins (or the like). The advantage results from the low thermal conductivity of the first layer compared to aluminium, coupled with a resistance to heat deformation which is better than polyester. There are many different types of heat sensitive compositions suitable for use with a first layer according to the present invention. Preferred compositions are as described in Applicant's PCT Patent Application Nos. PCT/GB97/01117 and PCT/GB98/01953, the contents of which are incorporated herein by reference. It is especially preferred that the composition is as described in the former PCT application.

Where said first layer is part of a printing plate, it may, in some circumstances, be provided with a backing, for example of polyester, to adjust the total thickness of the plate to enable it to be fixed to a press.

Said plate may have a width of at least 10 cm, suitably at least 20 cm, preferably at least 30 cm, more preferably at least 40 cm, especially at least 50 cm. Said plate may have a width of less than 300 cm, suitably less than 200 cm, preferably less than 160 cm, more preferably less than 100 cm, especially less than 80 cm.

Said plate may have a length of at least 20 cm, suitably at least 40 cm, preferably at least 60 cm. Said plate may have a length of less than 300 cm, suitably less than 250 cm, preferably less than 200 cm, more preferably less than 150 cm, especially less than 105 cm.

Said plate may have a thickness of at least 0.03 mm, preferably at least 0.04 mm, and, more preferably at least 0.05 mm. The thickness may be less than 0.3 mm, suitably less than 0.25 mm, preferably less than 0.2 mm, more preferably less than 0.15 mm, especially less than 0.12 mm.

A printing member, especially a printing plate, prepared according to preferred embodiments of the invention may have advantages over other known supports. For example, compared to aluminium plates, plates of the invention may be: lighter (and, therefore, more easily transported handled and stored); less sharp at their edges; able to be baked at reasonable temperature for reasonable time with little detriment; capable of being dried and/or cured during manufacture and/or development using electromagnetic forms of drying; less susceptible to kinking and/or denting; usable in equipment, such as film image setters, generally used for polyester products; and usable in heat mode applications, especially where a heated body is used to image. Compared to polyester, plates of the invention may be: capable of being used for relatively long print runs; robust; suitable for colour printing due to low susceptibility to stretch on-press; usable in heat mode applications, especially where a heated body is used to image; and able to be baked.

According to a second aspect of the invention, there is provided a method of preparing a printing member comprising providing an image-defining means over a first layer comprising a fibrous material and a binder material.

The method may include the step of forming a hydrophilic layer, preferably over, more preferably on, said first layer, by contacting said first layer with a liquid comprising a silicate solution in which particulate material is dispersed.

Said silicate solution may comprise a solution of any soluble silicate including compounds often referred to as water glasses, metasilicates, orthosilicates and sesquisilicates. Said silicate solution may comprise a solution of a modified silicate for example a borosilicate or phosphosilicate.

Said silicate liquid may comprise one or more, preferably only one, metal or non-metal silicate. A metal silicate may be an alkali metal silicate. A non-metal silicate may be quaternary ammonium silicate.

Said silicate liquid may be formed from silicate wherein the ratio of the number of moles of Si species, for example $SiO_2$, to the number of moles of cationic, for example metal species is in the range 0.25 to 10, preferably in the range 0.25 to about 6, more preferably in the range 0.5 to 4.

Said silicate liquid is preferably alkali metal silicate. In this case, the ratio of the number of moles of $SiO_2$ to the number of moles of $M_2O$ in said silicate, where M represents an alkali metal may be at least 0.25, suitably at least 0.5, preferably at least 1 , more preferably at least 1.5. Especially preferred is the case wherein said ratio is at least 2.5. Said ratio may be less than 6, preferably less than 5 and more preferably less than 4.

Preferred alkali metal silicates include lithium, sodium and potassium silicates, with lithium and/or sodium silicate being especially preferred. A silicate liquid comprising only sodium silicate is most preferred.

Said silicate liquid may comprise 2 to 30 wt % of silicate (e.g. dissolved sodium silicate solid), preferably 5 to 20 wt %, more preferably 8 to 16 wt %. The liquid may be prepared using 10 to 60 wt %, preferably 30 to 50 wt %, more preferably 35 to 45 wt % of a silicate solution which comprises 30 to 40 wt % silicate.

Said liquid may include 5 to 60 wt % of particulate material. Preferably, the liquid includes 10 to 50 wt %, more preferably 15 to 45 wt %, especially 20 to 40 wt % of particulate material.

The ratio of the weight of silicate to the weight of particulate material in the liquid is preferably in the range 0.1 to 2 and, more preferably, in the range 0.1 to 1. Especially preferred is the case wherein the ratio is in the range 0.2 to 0.6.

Said liquid may include more than 20 wt %, preferably more than 30 wt %, more preferably more than 40 wt %, especially more than 45 wt % water (including water included in said silicate liquid). Said liquid may include less than 80 wt %, preferably less than 70 wt %, more preferably less than 65 wt %, especially less than about 60 wt % water.

Said particulate material in said liquid may include at least 20 wt %, preferably at least 30 wt % and, more preferably, at least 40 wt % of said first material described according to said first aspect. Said liquid may include 5 to 40 wt %, preferably 5 to 30 wt %, more preferably 7 to 25 wt %, especially 10 to 20 wt % of said first material.

Said particulate material in said liquid may include at least 20 wt %, preferably at least 30 wt % and, more preferably, at least 40 wt % of said second material described according to said first aspect. Said liquid may include 5 to 40 wt %, preferably 5 to 30 wt %, more preferably 7 to 25 wt %, especially 10 to 20 wt % of said second material.

Where the liquid comprises a silicate and said particulate material comprises a first material and a second material as described, the ratio of the wt % of silicate (e.g. dissolved sodium silicate solid) to the wt % of said first material may be in the range 0.25 to 4, preferably in the range 0.5 to 1.5 and more preferably about 1. Similarly, the ratio of the wt % of silicate to the wt % of said second material may be in the range 0.25 to 4, preferably in the range 0.5 to 1.5 and more preferably about 1. The ratio of the wt % of first material to the wt % of second material may be in the range 0.5 to 2, preferably in the range 0.75 to 1.5, more preferably about 1 to 1.

Said particulate material may include a third material which is preferably adapted to lower the pH of the liquid. Said third material may be a colloid, suitably colloidal silica or an inorganic salt, suitably a phosphate, with aluminium phosphate being preferred. Where a third material is provided, preferably less than 30 wt % more preferably less than 20 wt %, especially less than 10 wt % of said particulate material is comprised by said third material.

The pH of said liquid may be greater than 9.0, is preferably greater than 9.5 and, more preferably, greater than 10.0. Especially preferred is the case wherein the pH is greater than 10.5. The pH is suitably controlled so that the silicate remains in solution and does not form a gel. A gel is generally formed when the pH of a silicate solution falls below pH9. The pH of said liquid is preferably less than 14, more preferably less than 13. It is understood that the pH of the liquid affects the adhesion of the hydrophilic layer on the support. It is found that the use of a liquid having a pH as described can lead to good adhesion.

The liquid may include other compounds for adjusting its properties. For example, the liquid may include one or more surfactants. Said liquid may include 0 to 1 wt % of surfactant (s). A suitable class of surfactants comprises anionic sulphates or sulphonates. The liquid may include viscosity builders for adjusting the viscosity of the liquid. Said liquid may include 0 to 10 wt %, preferably 0 to 5 wt % of viscosity builder(s). Also, the liquid may include dispersants for dispersing the inorganic particulate material throughout the liquid. Said liquid may include 0 to 2 wt % of dispersant(s). A suitable dispersant may be sodium hexametaphosphate.

Said liquid may have a viscosity of less than 100 centipoise when measured at 20° C. and a shear rate of 200 $s^{-1}$ using a Mettler Rheomat 180 Viscometer incorporating a double gap measuring geometry. Preferably, said viscosity is less than 50 centipoise, more preferably less than 30 centipoise when measured as aforesaid. Especially preferred is the case wherein the viscosity is less than 20 centipoise.

The method preferably includes the step of providing suitable conditions for the removal of water from the liquid after it has been applied over said first layer. Suitable conditions may involve passive or active removal of water and may comprise causing an air flow over the support and/or adjusting the humidity of air surrounding the support. Preferably, the method includes the step of arranging the support in a heated environment. The support may be placed in an environment so that its temperature does not exceed 230° C., preferably does not exceed 200° C. and, more preferably, does not exceed 175° C. Especially preferred is the case wherein the support temperature does not exceed 150° C.

The support may be arranged in the heated environment for less than 180 seconds, preferably less than 120 seconds and, more preferably, less than 100 seconds.

One advantage of the use of a first layer as described is that at any stage in the manufacturing process, electromagnetic means of drying may be used. Such means include the use of IR or of microwaves.

According to a third aspect of the invention, there is provided a method of manufacturing a first layer of a printing plate, the method comprising contacting a fibrous material with a binder material.

Said fibrous material preferably comprises a plurality of fibres which are held in position, for example by a physical and/or chemical interaction, relative to one another before contact of said fibrous material with said binder. Said method preferably involves impregnating a preformed mass of fibres with said binder material, suitably so that said fibrous material becomes embedded in said binder material and suitably so that said binder material is substantially uniformly dispersed throughout said first layer.

Said method preferably does not involved the drawing of said binder material into a film.

The invention extends to a method of printing using a printing member as described herein.

Any feature of any aspect of any invention or embodiment described herein may be combined with any feature of any aspect of any other invention or embodiment described herein.

The invention will now be described, by way of example.

The following materials are referred to hereinafter:

NEMA FR4 N4000-2—a multi-functional epoxy laminate (a material used in PCB manufacture) obtained from New England Laminates (U.K.) Limited was used. This comprises a woven borosilicate glass fibre yarn (designated 7628) (E glass) made by heating the following in a furnace at 1400° C. —$SiO_2$ (55 wt %), $Al_2O_3$ (14.5 wt %), CaO (21.8 wt %), MgO (0.5 wt %) $B_2O_3$ (8.0 wt %), $Na_2O$ (0.5 wt %) and $TiO_2$ (0.5 wt %) The woven material is impregnated with a multi-functional brominated epoxy resin having a Tg (measured by DSC) of about 140° C. The ratio of resin:weight of glass fibre is approximately 43:57. The impregnate is laminated on both sides with copper foil at a coating weight of about 28 $gft^{-1}$ (about 14 $gft^{-1}$ per side). The laminate has a Young's modulus in the X and Y directions of 2.45 and 2.87 $Kg/cm^2 \times 10^5$ respectively; a density of about 1.79 $g/cm^3$; and a glass transition temperature (measured by DSC) of 140° C.

Thermount—an aramid epoxy composite (grade FR4 N4500-6T) comprising non-woven Aramid fibres impregnated with an epoxy resin, obtained from New England Laminates (U.K.) Limited. The material is laminated on both sides with copper foil as for NEMA FR4 N4000-2.

461 glass fabric—a borosilicate glass (E glass) fibre having warp yarn EC5 11, weft yarn EC5 11, 48 ends/cm, 21 picks, a plain weave, a tensile strength in the warp direction of 1100 MPa, a tensile strength in the weft direction of 400 MPa, a weight of 79 $gm^{-2}$ and a gauge of 0.07 mm, obtained from CS Interglass Ltd of Dorset, England.

Glass veil 20103—non-woven E-glass having fibres of length 12 mm and diameter 6.5 $\mu$m, together with PVA binder (20%) and having a matt density of 140 $gm^{-2}$ and a weight per unit area of 10 $gm^{-2}$.

SRBP (Synthetic Resin Bonded Paper)—a Kraft paper (a strong paper made chiefly from pine by digestion with a mix of caustic soda, sodium sulphate, sodium carbonate and sodium sulphide) which has been impregnated to a high level with a phenolic resin (a phenol/aldehyde condensate).

Ludox HS40—a colloidal silica obtained from Aldrich Chemical Company, Gillingham, UK.

Aerosil C—a colloidal silica obtained from Degussa AG, Frankfurt, Germany.

Glascol 44—an acrylic emulsion obtained from Ciba Speciality Chemicals of Bradford, England.

WAC-20—a modified copolyester resin dispersion (20% in water) obtained from Siber Hegner Limited of Kent, England.

Azdel PH 10400—a fibre/resin composite having 22 wt % polypropylene resin, obtained from GE Plastics Ltd of Cheshire, England.

Cycom 761-1—a fibre/resin composite having 45 wt % resin, obtained from Cytec Aerospace Ltd of Wrexham, England.

Maritex 3101-2-SW75—a fibre/resin composite obtained from CS Interglass Ltd of Dorset, England.

EXAMPLE 1

Step 1

Preparation of Support

NEMA FR4 N4000-2 laminate having a thickness of about 0.14 mm was treated so as to strip the copper layers therefrom. This was done by immersion of the laminate in $CuCl_2$ stripping solution comprising water (100 Kg), anhydrous copper chloride (40 Kg) and hydrochloric acid (28 wt % solution; 60 Kg) at 60° C. until the copper was removed. The remaining glass fibre/epoxy resin impregnate ("fibreboard") was washed with water and air dried.

The fibreboard material had a thickness of 0.11 mm; an ultimate tensile strength in the x and y directions of 177 and 237 MPa respectively; a Young Modulus (tension) in the x and y directions of 26 and 28 GPa respectively; and a density of 1.6 $gcm^{-3}$.

The fibreboard material was cut to a size of 420 mm by 297 mm and backed with 0.1 mm polyester using a spray mount adhesive available from 3M so that it was thick enough to run on a press.

Step 2

Preparation of Coating Formulation

The following reagents are used in the preparation:

Sodium silicate solution having a ratio $SiO_2$:$Na_2O$ in the range 3.17 to 3.45 (average about 3.3); a composition of 27.1–28.1 wt % $SiO_2$, 8.4–8.8 wt % $Na_2O$, with the balance being water; and a density of about 75 Twaddel (°Tw), equivalent to 39.5 Baumé (°Bé) and a specific gravity of 1.375.

Deionised water having a resistivity of 5 Mohm.cm $Al_2O_3$ powder comprising alumina (99.6%) in the shape of hexagonal platelets. The mean particle size is 3 $\mu$m. The powder has a hardness of 9 Moh (on a 0–10 hardness scale).

Rutile titanium dioxide provided with an inorganic coating of $Al_2O_3$, ZnO and $ZnPO_4$. The mean crystal size is 0.23 $\mu$m.

Deionised water (48 g; 24 wt %) and sodium silicate solution (80 g; 40 wt %) were added to a 250 ml beaker and the solution sheared using a Silverson high shear mixer operating at maximum speed. Titanium dioxide powder (36 g; 18 wt %) was then added in portions of approximately 2 g every ten seconds. On completion of the addition, the liquid was sheared for a further two minutes. Then, alumina powder (36 g, 18 wt %) was added in portions of approximately 2 g every ten seconds. On completion of the addition, the liquid was sheared for a further two minutes. The viscosity of the liquid is found to be about 10 centipoise when measured at 20° C. and a shear rate of 200$s^{-1}$ using a Mettler Rheomat 180 Viscometer incorporating a double gap measuring geometry.

Step 3

Application of Coating Formulation

The coating formulation prepared in Step 2 was coated onto the sheet prepared in Step 1 using a rotating Meyer bar coater (designation K303) to give a 6 $\mu$m wet film thickness.

Step 4

Drying the Formulation

The coated sheet prepared in Step 3 was placed in an oven at 130° for 80 seconds. The sheet was then removed from the oven and allowed to cool to ambient temperature.

Step 5

Post-drying Treatment

The dried sheet prepared in Step 4 was immersed in aluminium sulphate (0.1M) for thirty seconds. The sheet was then spray rinsed for about twenty seconds using tap water and fan dried.

Step 6

Application of Light Sensitive Coating

A printing plate was produced from the sheet prepared in Step 5 by coating, using a Meyer bar, a light sensitive material of the quinone diazide/novolak resin type at a dry coating weight of 2 $g/m^2$. The light sensitive material was dried at 130° C. for 80 seconds.

The printing plate prepared in Step 6 was exposed through a mask and developed according to standard procedures. The plate was found to have comparable performance to a conventional aluminium plate in terms of exposure/development and a Young's Modulus (tension) of 33 GPa measured in the direction of the weft. Then the plate was run on a Heidelberg Speedmaster 52 Press. The press was stopped after 42,000 impressions and the plate inspected and found to be generally unworn.

Other formulations which can be applied to the fibreboard are described in Examples 2 to 5.

EXAMPLE 2

Instead of the coating formulation of Example 1 an alternative formulation was prepared by adding the following components to deionized water (40 wt %) in the order given. After each addition, the formulation was subjected to high shear mixing.

| COMPONENT | WT % |
|---|---|
| Hombitan LW (Trade Mark) -anatase $TiO_2$ (mean primary particle size of 0.2 μm) | 14.2 |
| Microgrit C3 (Trade Mark) for alumina powder (mean primary particle size of 3 μm) | 14.2 |
| Sodium silicate solution as in Eg. 1. | 31.2 |

EXAMPLE 3

The procedure of Example 2 was followed except that the following components were mixed in step 2 in the order given below.

| COMPONENT | WT % |
|---|---|
| Deionized water. | 21.51 |
| Hombitan LW (Trade Mark) as in Eg. 2. | 14.15 |
| Alumina powder as in Eg. 2. | 14.15 |
| Sodium polysilicate solution - having a $SiO_2$: $Na_2O$ ratio of 5.2:1 and containing 22.78% solid. | 50.19 |

EXAMPLE 4

The procedure of Example 2 was followed by mixing the following components in step 2 in the order given below.

| COMPONENT | WT % |
|---|---|
| Deionized water. | 33.29 |
| Hombitan LW (Trade Mark) as in Eg. 2. | 11.83 |
| Alumina powder as in Eg. 2. | 11.83 |
| Bindzil 15/500 (Trade Mark) a colloidal silica having average on particle size of 7 nm | 1.1 |
| Sodium polysilicate as in Eg. 3. | 41.95 |

EXAMPLE 5

The procedure of Example 2 was followed by mixing the following components in step 2 in the order given below.

| COMPONENT | WT % |
|---|---|
| Deionized water. | 40 |
| Hombitan LW as in Eg. 2. | 14.23 |
| Alumina powder as in Eg. 2. | 13.23 |
| Fabutit 748 (Trade Mark) - aluminium phosphate | 1.0 |
| Sodium silicate as per Example 1. | 31.5 |

EXAMPLE 6

A 459 mm×175 mm×0.35 mm sheet of NEMA FR4 N4000-2 was treated as described in Example 1, Step 1 to prepare fibreboard.

EXAMPLE 7

A 459 mm×175 mm×0.35 mm sheet of Thermount was treated as described in Example 1, Step 1 to remove the copper and prepare fibreboard.

Comparative Examples C1 and C2

459 mm×175 mm×0.3 mm sheets of aluminium (lithograde 1050) and polyester film (P175 obtained from Agfa Gervaert) respectively were used.

EVALUATION OF SUPPORTS OF EXAMPLES 6, 7, C1 AND C2 EXAMPLE 8

The supports of Examples 6, 7, C1 and C2 were treated as described in Example 1, Steps 3 to 6 and subsequently imaged and developed by conventional means.

Whereas the plate of Example C2 produced about 10,000 prints of good image quality prior to print failure, the plates of Examples 6, 7 and C1 produced over 25,000 prints of excellent quality without print failure.

EXAMPLE 9

The mechanical properties of areas, from which imageable material had been removed, of plates prepared as described in Example 8 were evaluated using a Hounsfield tensometer set up with the following values:

Force—20% range

Extension range—50 mm

Speed—0.5 mm/min

Results are provided in Table 1.

| Example No | Tensile Strength (MPa) | Elastic Modulus (GPa) | Elastic yield strength (MPa) | % elongation to elastic yield point | % elongation to inelastic yield point |
|---|---|---|---|---|---|
| C1 | 155 | 72 | 154 | 0.1 | 0.8 |
| C2 | 162 | 3.5 | 92 | 45 | 102.5 |
| 6 | 348 | 34 | 348 | 0.9 | 0.8 |
| 7 | 210 | 28.9 | 1210 | 0.5 | 0.8 |

EXAMPLE 10

The speed, developer resistance, isopropyl alcohol resistance, fountain solution resistance, plate cleaner resistance and phosphoric acid resistance of the plates described in Example 8 were evaluated. It was found, generally, that the plates of Examples 6 and 7 performed substantially the same as or better than the plates of Examples C1 and C2.

EXAMPLE 11

A conventional Silver Diffusion Up plate was prepared using fibreboard, prepared as described in Example 6, as a support. The plate was imaged using a HeNe imagesetter followed by development with a standard developer.

EXAMPLES 12 AND 13

Respective samples of fibreboard prepared as described in Example 7 and SRBP were coated with gelatin prior to being used to prepare imaged Silver Diffusion Up plates as described in Example 11.

EXAMPLE 14

Fibreboard prepared as described in Example 7 was coated with a waterless imageable layer as described, for example, in WO97/07430 (the contents of which are incorporated herein by reference). The plate prepared was exposed through a positive film using a Montakop frame, baked at 130° C. for 3 minutes and developed using a proprietary developer at 20° C. for 60 seconds.

EXAMPLE 15

Mechanical properties of areas, from which imageable material had been removed, of the plates of Examples 11 to 14 were evaluated as described in Example 9. Results are provided in Table 4.

TABLE 4

| Example No | Tensile Strength (MPa) | Elastic Modulus (GPa) |
|---|---|---|
| 11 | 343 | 31 |
| 12 | 234 | 30.1 |
| 13 | 110 | 22.5 |
| 14 | 251 | 29.9 |

EXAMPLES 16 TO 30

Samples of fibreboard prepared as described in Example 7 were coated with a range of hydrophilic layers and a range of imaging layers and the resulting plates imaged accordingly.

The following hydrophilic layers were used:

Silicate layer—this was prepared as described in Example 1, Steps 2–5.

Polyester layer—this comprised a 8 μm (wet film thickness) layer of WAC-20.

Phosphate layer—a formulation was prepared by mixing the following successively over 1 minute using a high shear mixer:

Aluminium oxide—0.65 g

Microgrit C3 alumina—12 g

Deionized water—32.9 g

Monoaluminium phosphate (50%)—47.4 g

Colloidal Silica layer—an "acidified Ludox" formulation was prepared by mixing Ludox HS40 (25 g) and HCl (35% g, 0.25 ml) for 30 minutes. The following were then added successively to the acidified Ludox (5 g) with high shear mixing over 1 minute:

Titania—0.25 g

Microgrit C3 alumina—3 g

Polyvinyl alcohol (10%)—5 g

Water—20 g

Zirconia layer—a zirconia sol was prepared by mixing zirconium carbonate (60 ml) and nitric acid over 5 minutes. Then, the following were added successively to the zirconia sol (25 g), with high shear mixing over 1 minute:

deionized water—83 g

Aerosil C—1 g

Hombitan LW—1 g

The following printing plate types and imaging processes were used:

Quinone diazide/novolak resin plate (OD/N)—this was prepared by coating a conventional quinone diazide/novolak resin formulation as described in Example 1, Step 6 and imaging and developing using conventional means.

Silver Diffusion Down plate (SDD)—a plate was prepared, imaged and developed by conventional means.

Waterless plate—a waterless coating composition was used as described in Example 14.

Inkjet plate—an image was formed by passing a substrate through a Hewlett Packard Deskjet 1600C printer.

Thermally-imageable plate—A thermally-imageable coating of a type described in PCT/GB97/01117 (the contents of which are incorporated herein by reference) was used. The plate was imaged using a Creo Trendsetter 3244 at an imaging energy density of 200 mJ/cm$^2$ followed by development and gumming.

Ablatable plate—an ablatable coating comprising carbon black and nitrocellulose was prepared and used to directly coat the fibreboard prior to application of a hydrophilic layer over the ablatable coating. The plate was imaged using the Creo Trendsetter 3244 at an imaging density of 600 mJcm$^{-2}$.

Thermal nib coating plate—a thermally-imageable coating of a type described in PCT/GB97/01117 was used and imaged using a soldering iron at 320° C.

The plates prepared were evaluated as described in Example 9. A summary of the constitution of the plates and the results of the evaluations is provided in Table 5.

TABLE 5

| Example No | Hydrophilic Layer | Plate type | Tensile Strength (MPa) | Elastic Modulus (GPa) |
|---|---|---|---|---|
| 16 | Silicate | QD/N | 332 | 34 |
| 17 | " | SSD | 301 | 39 |
| 18 | " | Inkjet | 324 | 34 |
| 19 | " | Thermally-imageable | 313 | 40 |
| 20 | " | Ablatable | 309 | 41 |
| 21 | " | Waterless | 285 | 37 |

TABLE 5-continued

| Example No | Hydrophilic Layer | Plate type | Tensile Strength (MPa) | Elastic Modulus (GPa) |
|---|---|---|---|---|
| 22 | " | Thermal nib | 297 | 38 |
| 23 | Polyester | QD/N | 299 | 40 |
| 24 | " | Inkjet | 308 | 38 |
| 25 | Phosphate | QD/N | 292 | 39 |
| 26 | " | Inkjet | 312 | 43 |
| 27 | Colloidal silica | QD/N | 321 | 32 |
| 28 | " | Inkjet | 338 | 43 |
| 29 | Zirconia | QD/N | 314 | 40 |
| 30 | " | Inkjet | 326 | 39 |

EXAMPLES 31 TO 37

The mechanical and water resistance properties of a range of other materials were assessed as follows:

Water-resistance—this was assessed by hand tearing a first 10 cm×10 cm section of material and immersing a second similar section in tap water for 5 minutes and then hand tearing it. If the first and second sections had similar tear resistance, then the material was rated as having "good" water resistance. If the second support tore much easier than the first, then the water resistance was rated as "poor".

Flexure—this was assessed by the ease with which 1 inch wide strips could be rolled into coils without creasing or cracking. If a core of less than 2 inches (about 5 cm) could not be achieved, then the support was rated as having "poor" flexure; if a core of less than 2 inches (about 5 cm) could be achieved then the rating was "good".

Table 6 gives the results of the aforementioned properties together with other properties of the materials assessed.

TABLE 6

| Example No | Material | Tensile Strength (MPa) | % Elongation | Elastic Modulus (GPa) | Density gcm$^{-2}$ at 20° C. | Water resistance | Flexure |
|---|---|---|---|---|---|---|---|
| C1 | aluminium | 170 | 0.1 | 69 | 2.7 | good | good |
| C2 | polyester | 162 | 45 | 3.5 | 1.4 | good | good |
| 31 | fibreboard of Eg. 6 | 348 | 0.9 | 34 | 1.79 | good | good |
| 32 | fibreboard of Eg. 7 | 210 | 0.5 | 28.9 | 1.65 | good | good |
| 33 | SRBP | 90 | 0.4 | 20.8 | 1.52 | good | good |
| 34 | Azdel PH 10400 | 97 | 1.9 | 5.o | 1.19 | good | good |
| 35 | Cycom 761-1 | 827 | 0.4 | 61 | 0.97 | good | good |
| 36 | Maritex 3101-2-SW75 | 457 | 0.29 | 30.3 | 1.2 | good | good |

EXAMPLE 37

A 12 cm×18 cm sheet of woven borosilicate glass fibre yarn (designated 7628 as described in Example 1, step 1) was impregnated with the coating formulation prepared in Example 1, Step 2 by coating using a rotating meyer bar coater to give a 10–14 $\mu$m wet film thickness. Thereafter, the impregnate was dried as described in Example 1, Step 4, post-treated as described in Example 1, Step 5 and a light-sensitive coating applied as described in Example 1, step 6. The plate prepared was exposed and developed according to standard procedures. An image was formed wherein image areas were ink-accepting and non-image areas were hydrophilic.

EXAMPLES 38 TO 45

Samples of 461 glass fabric or glass veil 20103 were dipped in one of the binder impregnate formulations described below. The wet fabric was then laid on a sheet of glass and allowed to dry in an oven at 130° C. fr 120 seconds. The impregnated fabric was then pulled gently from the glass, replaced and dried again at 130° C. for 300 seconds and subsequently allowed to cool to ambient temperature.

One substrate (referred to herein as 461/Glascol/Hombitan) was prepared by placing 461 glass fabric onto a glass sheet and coating it with Glascol 44 using a horn mayer bar. Hombitan LW was sprinkled using a sieve onto the surface of the wet Glascol and pressed onto the surface by placing an aluminium plate on the powder and rolling a metal rolling pin over the plate surface. After removal of the plate, the sample was dried in an oven at 130° C. for 5 minutes and then sprayed with water and wiped with a damp wad of cotton wool and fan dried.

Quinone diazide/novolak resin plates were prepared imaged and developed as described above for Example 16.

The following binder impregnate formulations were used:

Silicate—this was as described in Example 1, Step 2 and post-treated as described in Example 1, Step 5.

Polyester, Phosphate, TEOS, Zirconia—these were the formulations used to prepare the correspondingly named layers described with reference to Examples 16 to 30.

Zirconia/PAA—this comprised the zirconia sol (50 g) described with reference to Examples 16 to 30 and polyacrylic acid.

Glascol 44/Hombitan LW—this comprised Glascol 44 (70 g) and Hombitan LW (30 g).

The plates prepared were evaluated as described in Example 9. A summary of the plates prepared and the results of the evaluations are provided in Table 7. (It should be noted that the 461/Glascol/Hombitan Substrate was tested prior to any photocoat application).

TABLE 7

| Example No | Fabric | Binder Impregnate formulation | Ultimate Tensile Strength (MPa) | Elastic Modulus (GPa) |
|---|---|---|---|---|
| 38 | 461 glass fabric | silicate | 280 | 39 |
| 39 | 461 glass fabric | polyester | 275 | 39 |

TABLE 7-continued

| Example No | Fabric | Binder Impregnate formulation | Ultimate Tensile Strength (MPa) | Elastic Modulus (GPa) |
|---|---|---|---|---|
| 40 | 461 glass fabric | phosphate | 289 | 35 |
| 41 | 461 glass fabric | Colloidal silica | 291 | 38 |
| 42 | 461 glass fabric | zirconia | 283 | 39 |
| 43 | 461 glass fabric | zirconia/PAA | 263 | 27 |
| 44 | 461 glass fabric | Glascol44/ Hombitan LW | 255 | 26 |
| 45 | 461 glass fabric | polyester | 89 | 3.9 |

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A printing member which includes:

(a) a first layer comprising a fibrous material and a binder material, wherein said fibrous material comprises ceramic fibers;

(b) a second layer residing on said first layer, wherein said second layer is a hydrophilic layer and comprises a binder material and particulate material, said binder material comprising a polymeric structure which includes —Si—O—Si— moieties in which the particulate material is arranged; and (c) an image defining means.

2. A printing member according to claim 1, wherein said member is a planographic printing member.

3. A printing member according to claim 1, wherein said fibrous material is embedded in said binder material.

4. A printing member according to claim 1, wherein said fibrous material is in the form of a non-woven fabric.

5. A printing member according to claim 4, wherein said non-woven fabric is a paper.

6. A printing member according to claim 1, wherein said fibrous material is in the form of a woven fabric.

7. A printing member according to claim 1, wherein fibers of said fibrous material are held together by a means in addition to any holding together effected by the presence of said binding material.

8. A printing member according to claim 1, wherein said first layer is preparable by contacting a preformed mass of fibrous material with a said binder material.

9. A printing member according to claim 1, wherein said first layer includes at least 30 wt % of said fibrous material.

10. A printing member according to claim 1, wherein said first layer includes at least 30 wt % of said binder material.

11. A printing member according to claim 1, wherein the Young's modulus of said first layer is at least 8 GPa and less than 70 GPa.

12. A printing member according to claim 1, wherein said binder material is a resin.

13. A printing member according to claim 1, wherein the hydrophilic layer is a non-ink accepting layer which is over said first layer.

* * * * *